F. L. GLADISH.
TRACTOR.
APPLICATION FILED AUG. 27, 1917.

1,314,391.

Patented Aug. 26, 1919.
5 SHEETS—SHEET 1.

Witness
Chas. W. Stauffiger
Karl H. Butler

Inventor
Frank L. Gladish,
By Barthel & Barthel
Attorneys

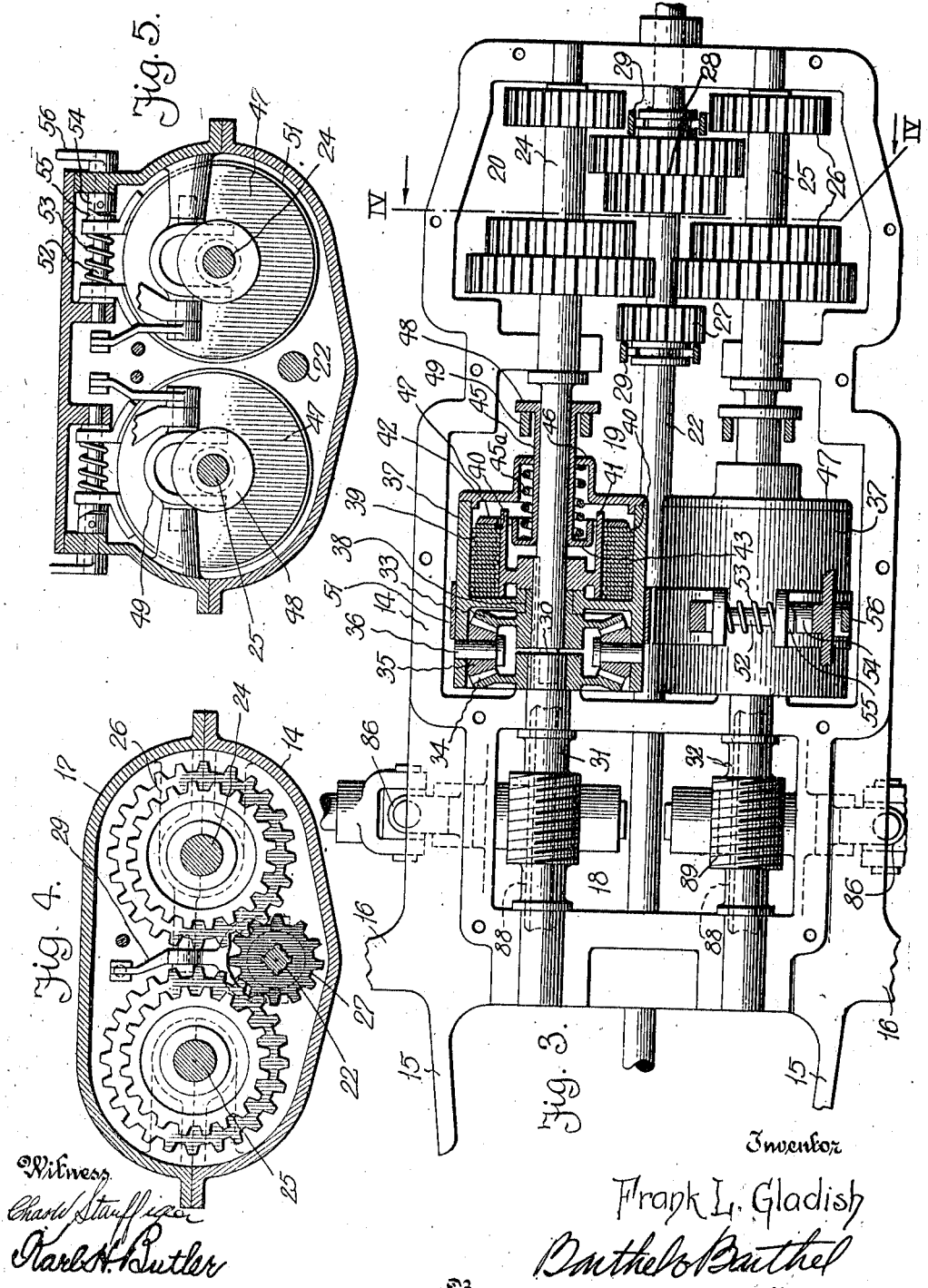

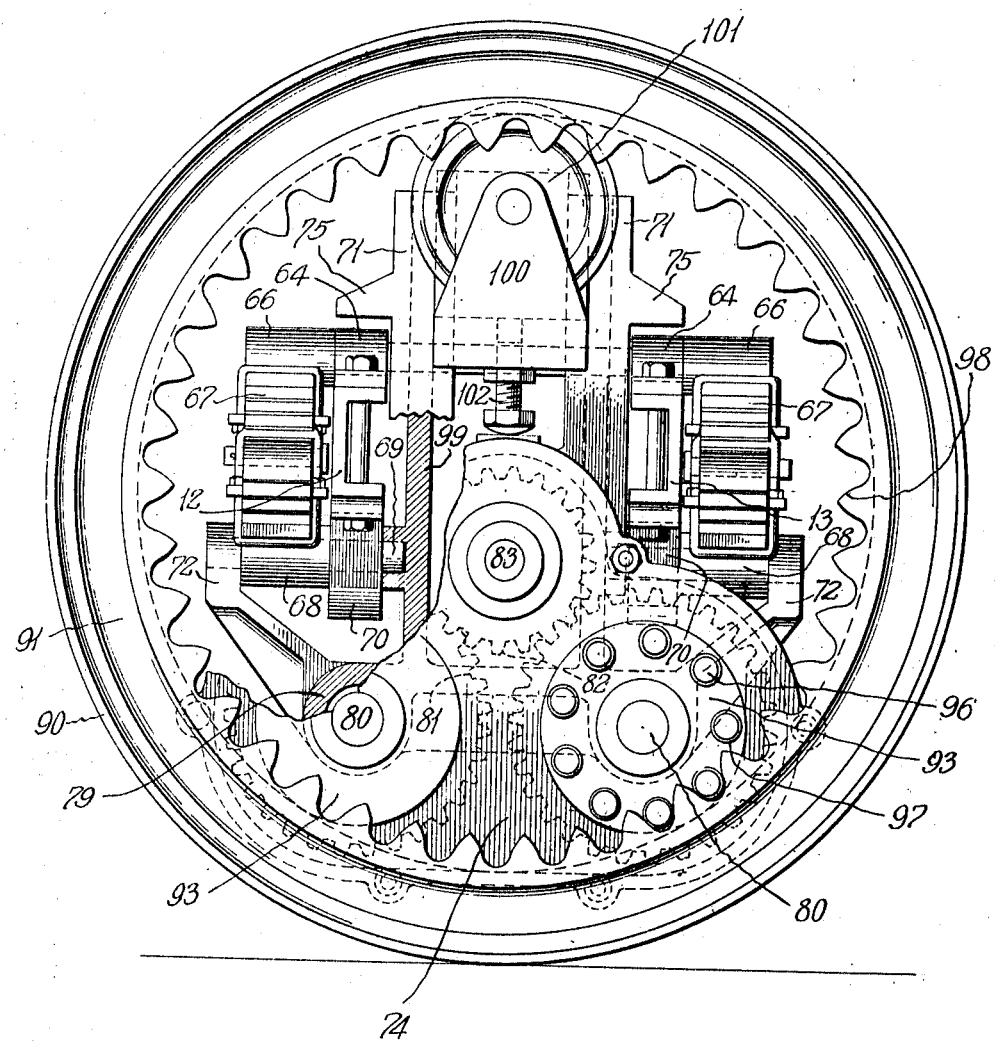

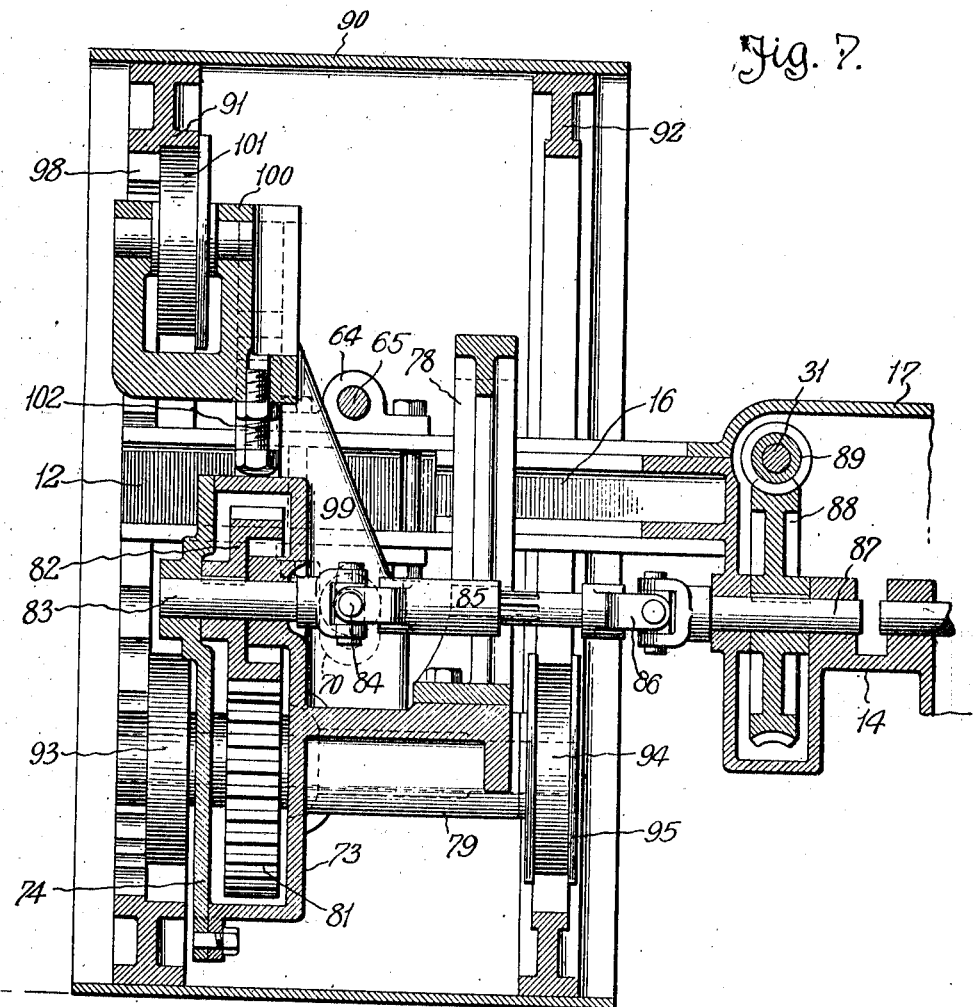

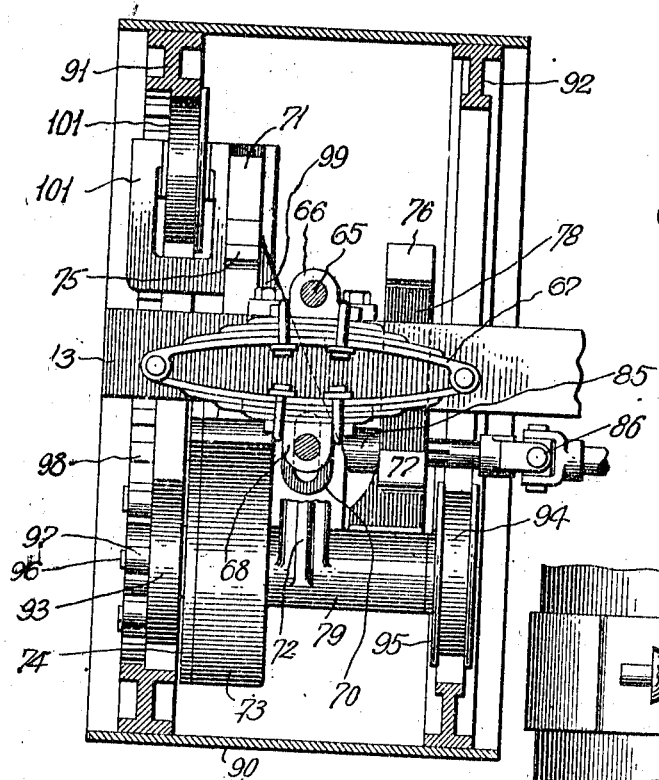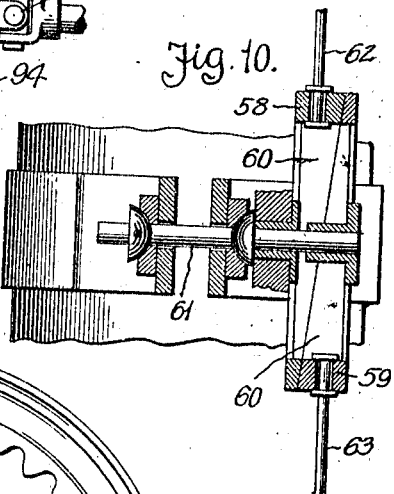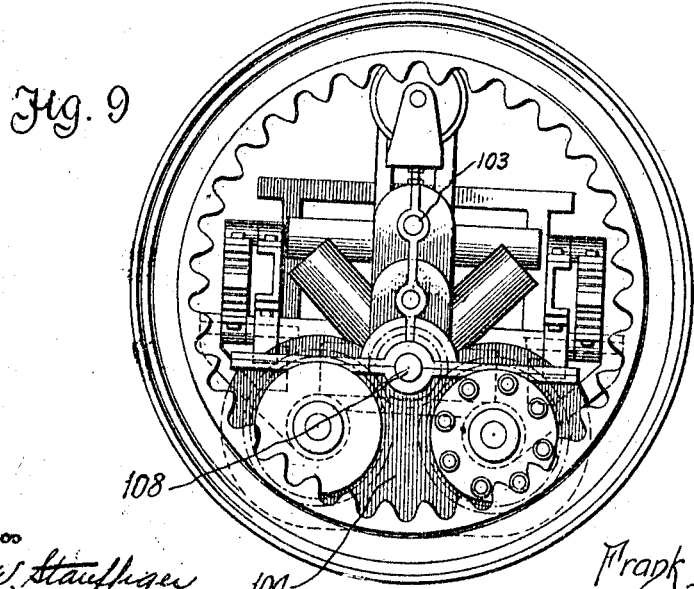

UNITED STATES PATENT OFFICE.

FRANK L. GLADISH, OF DETROIT, MICHIGAN.

TRACTOR.

1,314,391.   Specification of Letters Patent.   Patented Aug. 26, 1919.

Application filed August 27, 1917. Serial No. 188,476.

*To all whom it may concern:*

Be it known that I, FRANK L. GLADISH, a citizen of the United States of America, residing at Detroit, in the county of Wayne and State of Michigan, have invented certain new and useful Improvements in Tractors, of which the following is a specification, reference being had therein to the accompanying drawings.

This invention relates to tractors, and has special reference to a tractor that is characterized in the following particulars:

First. the tractor is of that type having two power traction wheels of considerable width and a single or double trailer wheel or caster at the rear end of the machine. The wide tractor wheels or drums are disposed for lateral tilting so that the main frame or body of the tractor may be self balancing or self adjusting irrespective of the inclination of the wheels. A tractor so constructed possesses many advantages among which may be mentioned its extensive use on farms. At present, what is commonly styled "round wheel tractors" in contradistinction to those of the caterpillar type, may be only used a few months in each year on account of field conditions but with wheels or traction members of considerable width and having a tilting action it is possible to use the tractor for all kinds of field work and on ground that would prohibit the use of tractors other than of the caterpillar type. The tilting action of the traction wheels also admits of the tractor being used on hilly or irregular ground without any danger of capsizing.

Second, the main frame or body of the tractor extends into the traction wheels or members and constitutes stationary hubs with the traction wheels or members in rolling relation thereto; the power being transmitted to the traction wheels or members contiguous to the periphery thereof and at such points as to insure a positive application of power where the greatest resistance may be encountered, thus avoiding stresses and strains which otherwise may tend to rack and dismember the tractor. In applying power at such points where the greatest resistance is encountered the application of the power tends to increase the traction of the machine, and all of this is accomplished irrespective of the position of the traction wheels and members relative to the power plant. At the same time that provision is made for applying power to the rims of traction wheels or members, means is employed within said wheels or members to relieve the power plant of shocks and vibrations that may be set up when the traction wheels or members encounter obstacles or irregular ground, and such means is distributed so as to lend some weight to the traction wheels or members and thus increase the tractive power of the machine.

Third, my tractor is further characterized by a novel differential mechanism associated with a transmission mechanism so that besides obtaining first, second, and third speeds through the transmission mechanism, it is possible to obtain the reverse or backward movement of the tractor through the differential mechanism and utilize said differential mechanism for power steering. Coöperating with the differential mechanism is what may be considered a brake mechanism by which one differential mechanism may be held so that one of the tractor wheels or members will be operated in a reverse direction to the other, and in consequence of such an arrangement, it is possible to power steer the tractor and turn the same within its own length. This feature alone contributes to the extensive use of the tractor in restricted areas, particularly where cultivating work is to be carried on in the corner of a field.

Fourth, the tractor may not only be used for ordinary tractor purposes, but provision is made so that the same may be used as a truck, and it is in this connection, that the machine includes a construction by which a load may be carried in front of the tractor wheels or members and other work, such as the operation of stationary farm implements, is performed by having a winch or pulley in direct alinement with the drive shaft of the power plant to be operated thereby. This may be accomplished by having the transmission mechanism of the tractor in neutral position so that the tractor will remain stationary while the power plant is employed for imparting movement to a winch or pulley and suitable means may be employed as planetary or reduction gearing for reducing the speed of the winch or pulley relative to the power plant, when such reduction is necessary.

Fifth, as will be hereinfter set forth, it is possible, on account of the width or size of the traction wheels or members to locate individually operated power plants, as gasolene or steam engines, within the traction wheels or members, for driving the wheels or members according to the speed of each individual power plant and consequently being able to power steer the tractor irrespective of any other steering mechanism. Furthermore, by locating the power plant within the traction wheels or members, such mechanisms as the transmission and differential are eliminated, thus increasing the frame or body area for load purposes.

The above are a few of the characteristics by which my invention may be defined, and others will appear as the nature of the invention is better understood, with particular reference to the drawings and the detail description thereof.

In the drawings,

Fig. 3 is an enlarged plan of the transmission and differential mechanism, partly broken away and partly in section;

Fig. 4 is a cross sectional view of a transmission mechanism taken on the line IV—IV of Fig. 3;

Fig. 5 is a similar view showing the differential mechanism and brake applying mechanism therefor;

Fig. 6 is an enlarged side elevation of a traction wheel or member partly broken away and partly in section;

Fig. 7 is a longitudinal sectional view of the same;

Fig. 8 is a similar view of the traction wheel or member with the mechanism therein shown in elevation;

Fig. 9 is a side elevation of a traction wheel or member having a power plant located therein; and Fig. 10 is a horizontal sectional view of a brake applying mechanism.

Figure 1:
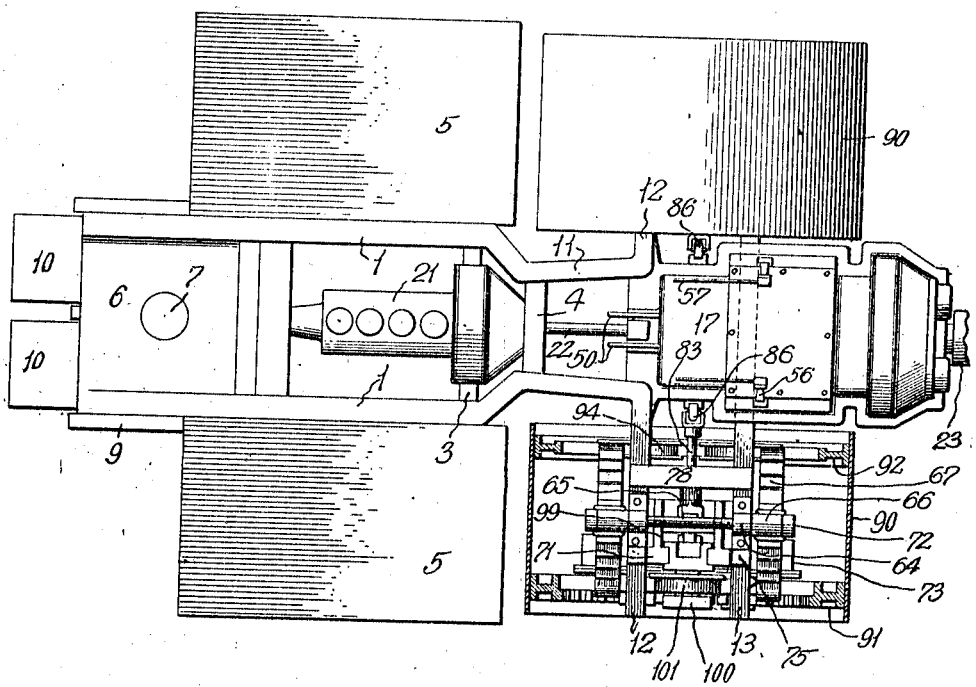
Figure 1 is a plan of the tractor with one of the wheels or members thereof in a horizontal section showing the mechanism within said wheel or member.

In describing my invention by aid of the views above referred to, I desire to point out that the same are intended as merely illustrative of the operatable machine as now constructed, and I do not care to confine my invention to the precise construction and arrangement of parts shown.

The following description is therefore to be broadly construed as including such substitute constructions and arrangement of parts which are the obvious equivalent of those to be hereinafter referred to.

In the drawings, the reference numeral 1 denotes side frames of the tractor body or main frame, said side frames being connected by transverse members 2, 3 and 4 with the member 2 protruding from the sides of the frame 1 so as to coöperate therewith in supporting platforms 5 or load receptacles. The rear ends of the frames 1 are connected by a bearing 6 for the pivot pin or king bolt 7 of a fifth wheel 8 carried by a rear truck 9 having a single or double wheel 10. The rear truck constitutes a swiveled trailer wheel or caster.

The frames 1 are preferably made of channel bars and said frames have the front ends thereof inset, as at 11, and bent outwardly to provide lateral extensions 12; the end portions of said side frames providing clearance for traction wheels or members during a power steering operation.

Arranged in parallelism with the lateral extensions 12 of the frame 1 is a transverse frame 13 having a central depressed portion providing clearance for a combined transmission and differential mechanism casing 14, said casing being suitably connected to the frame 13 and having rearward and side extensions 15 and 16 connected to the frames 1 and lateral extensions 12 thereof, respectively. The casing 14 has a detachable cover 17 so that easy access may be had to the interior of said casing, and the rearward part of said casing provides a worm compartment 18 and the front part of said casing a transmission compartment 20, while an intermediate part of said casing provides a differential compartment 19.

The side frames 1 and the transverse connecting members 2, 3 and 4 thereof support a suitable power plant 21, which may include a conventional form of internal combustion engine, a fly wheel and clutch casing, cooling and ignition systems, controlling devices and such appurtenances as contribute to a powerful and economical source of power. The power plant 21 has an engine or drive shaft 22 extending forwardly and longitudinally through the casing 14, said shaft having the front end thereof provided with a winch or pulley 23 so that the power plant may be utilized, when the tractor is stationary, for operating various kinds of farm implements.

Journaled in the compartments 19 and 20 of the casing 14 are parallel shafts 24 and 25, and these shafts, within the transmission compartment 20, are provided with a series of gear wheels 26 adapted to be engaged by shiftable gear wheels 27 and 28 slidably keyed on the drive shaft 22 and adapted for rotation therewith, so that first, second and third speed may be imparted to either of the shafts 24 or 25 by shifting either of the gears 27 or 28. The gears 27 and 28 are shown in Fig. 3, in neutral position and a conventional form of gear shifting mechanism, generally denoted 29, in Figs. 3 and 4, may be employed.

In the differential compartment 19 of the casing 14 the shafts 24 and 25 have reduced ends 30 extending into the ends of worm shafts 31 and 32 journaled in the worm compartment 18 of the casing 14, the shafts 31 and 32 longitudinally alining with the shafts 24 and 25 respectively, and free to revolve relative to said shafts. The differential mechanisms of the alining shafts 24 and 31 and 25 and 32 are identical in construction, therefore I deem it only necessary to refer to one of said mechanisms in detail and then later on consider the relative action of said mechanisms.

In the differential compartment 19, the confronting ends of the shafts have fixed beveled gear wheels 33 and 34 and meshing with the confronting faces of these beveled gear wheels are differential beveled gear wheels 35 rotatable on inwardly projecting stud shafts 36 carried by a brake drum 37 having a hub portion 38 loose to revolve on the hub of the beveled gear wheel 33. The front end of the brake drum 37 has a friction disk clutch composed of disks 39 carried by the drum 37 and disks 40 carried by a clutch member 41 slidably keyed on the shaft 24 and adapted for rotation therewith.

Engaging the front end of the clutch member 41 is a peripheral flange 42 of a cup shaped pressure member 43, said member having a sleeve 45 slidable on the shaft 24. In the cup shaped pressure member 43 and encircling the sleeve 45 thereof is a coiled compression spring 45ª said spring extending into the cupped portion 46 of a cap 47 closing the front end of the brake drum 37. The expansive force of the spring 45ª is sufficient to hold the disks 39 and 40 normally in contact so as to establish a driving relation between the shaft 24 and the brake drum 37.

The sleeves 45 of the pressure members 43 have heads 48 and engaging said heads are the forks 49 of rods 50. By shifting the rods 50 the springs 45ª may be placed under compression to relieve the pressure of the member 43 against the clutch member thereby allowing the brake drum 37 to remain stationary relative to the shaft 24 as far as the clutch member 41 is concerned.

The brake drums 37 are adapted to be engaged and held by brake bands 51, and there are shown two forms of mechanism for actuating the brake band. Reference will first be had to Fig. 5, showing an end of each brake band loose on a rock shaft 52 journaled in the casing 14 and depending bearings of the cover 17. The other end of the brake band is also loose on the rock shaft and encircling said rock shaft between the ends of the brake band is a coiled compression spring 53, the expansive force of said spring holding the ends of the band normally separated and said brake band loose relative to the brake drum. Fixed on the rock shaft 52 is a collar 54 adapted to engage a cam 55 on one end of the brake band and shift this end of the brake band toward the other end of the brake band, thus applying the brake band to the brake drum to hold or retard the movement of the same. The end of the rock shaft 52 has a crank 56 and a rod 57 connected thereto facilitates rocking the shaft to set the brake band.

The other form of brake band actuating mechanism is shown in Fig. 10 and each brake band is controlled by wedge members 58 and 59 both of which are slotted, as at 60, so as to provide clearance for a tie rod 61 between the ends of the brake band. The wedge member 58 is connected to a rod 62 and the wedge member 59 to a rod 63, the latter adapted for operation in synchronism with the steering mechanism of the tractor and the former operatable for reverse speed, as will hereinafter appear.

Figure 2:
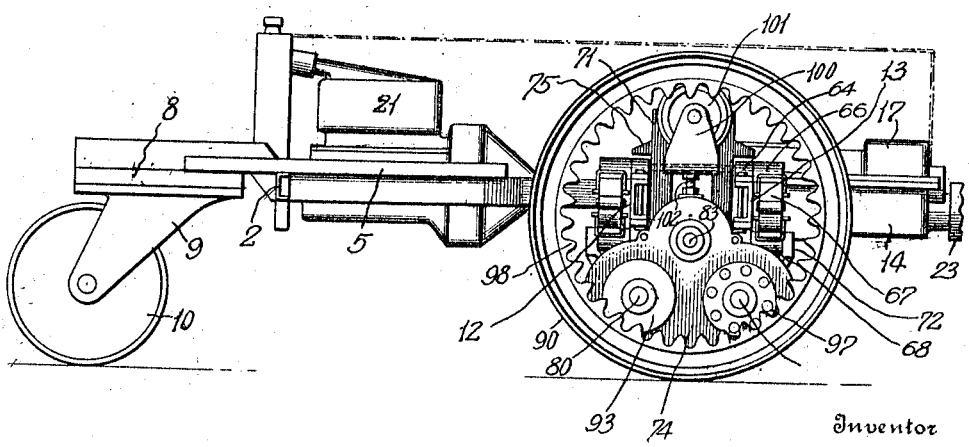
Fig. 2 is a side elevation of the tractor showing the hood or main casing by dot and dash lines.

The lateral extensions 12 of the side frames 1 and the ends of the transverse frame 13 are provided with bearings 64 for a transverse rigid rod 65. Fixed on the ends of the rod 65 are the bearing members 66 of elliptical springs 67, said springs having the lower leaves thereof provided with bearings 68 for rock shafts 69. The rock shafts 69 extend through slotted guides 70 depending from the extension 12 and the frame 13, so that said rock shafts may only have a vertical movement relative to the extension 12 and the frame 13. The ends of each rock shaft 69 are journaled in an upright 71 and end bracket 72 of a gear casing 73, having the outer side thereof provided with a detachable cover 74. The manner of suspending the gear casing 73 is such that said casing may have a vertical movement relative to the extension 12 and the frame 13, and through the medium of the rock shaft 69, have a lateral tilting movement. The lateral tilting movement is limited by lugs 75 (see Figs. 1, 2 and 8) on the upright 71 adapted to engage the extension 12 and the frame 13, and also by top and bottom lugs 76 and 77 (see Fig. 8) carried by an upright 78 (see Figs. 1, 7 and 8) between the extension 12 and the frame 13 to engage said extension and frame. The upright 78 forms a rectangular frame bolted to journal boxes 79 formed integral with the casing 73.

Journaled in the boxes 79 are shafts 80 provided with gear wheels 81, within the casing 73, meshing with a gear wheel 82 mounted on a shaft 83 journaled in the casing 73 and the cover 74 thereof, the gear wheel 82 being adapted to impart movement above the gear wheels 81. The shaft 83 has the inner end thereof provided with a universal joint 84, and said universal joint is connected by an extensible shaft 85 to another universal joint 86, carried by the end of a shaft 87 journaled in one side of the casing 14 at the worm compartment 18 thereof. On the shaft 87, within the worm compartment 18, is a large spur wheel 88 meshing with a worm 89 on the shaft 31.

Demountable relative to the gear casing 73, extensions 12 and the frame 13, at each side of the tractor, is a wide traction wheel or member 90 that may have the periphery or rim thereof provided with spuds or tread members so that said wheel may obtain a firm purchase or footing on various kinds of soil. The inner annular wall of the wheel or member 90 has two circular rails 91 and 92, adjacent the sides thereof constituting a track and adapted for a rolling action relative to said rails are wheels 93 and 94 mounted on the ends of the shafts 80 of the journal boxes 79. The wheels 94 engaging the rail 92 have peripheral side flanges 95 and at the outer sides of one of the wheels 93 are pins 96 provided with anti-frictional rollers 97, thus converting one of the wheels 93 into a roller pinion or pin wheel. The roller pinion is adapted to engage a circular rack 98 carried by the rail 91 and it is through the medium of the rack and pinion that power is transmitted to the traction wheel or member 90 from the train of gears in the casing 73 and from the universal flexible shaft driven from the shaft 87.

The uprights 71 are braced relative to the journal boxes 79 and the gear casing 73 by webs 99 and slidable between said uprights is a housing 100 for a revoluble flange wheel 101 that engages the outer rail 91. The housing 100 is supported between the uprights 71 by an adjustable member 102 engaging the top of the gear casing 73, said adjustable member being in the form of a screw or turn buckle which will permit of the housing 100 being raised or lowered.

With either side of the tractor, adjacent one of the wheels or member 90, jacked up or otherwise elevated, the member 102 can be adapted to lower the housing 100 and in consequence of such adjustment, the wheel or member 90 is lowered toward the ground moving the rails 91 and 92 out of engagement with the wheels 93 and 94. Further movement of the member 102, carries the wheel 101 out of engagement with the rail 91 particularly when the wheel or member 90 reaches the ground, but with the wheels 93 and 94 out of engagement with the rails 91 and 92, the wheel or member 90 can be lifted sidewise from the ends of the extensions 12 and the frame 13, thus exposing all of the mechanism ordinarily inclosed by the wheel or member 90. I attach considerable importance to this demountable feature of the large wide traction wheel, as wheels having various kinds of rims or treads can be used, for instance, a wheel having a smooth periphery for rolling or road work or a wheel having spuds or tread members, for field or hill work. Then again easy access can be had to the mechanism for repair, lubrication or adjustment purposes. With the traction wheels removed the wheels 93 can be removed from the shaft 80 and the cover 74 removed from the gear casing 73 when it is necessary to inspect the interior of said casing. As a matter of fact, all parts are assembled so that the same may be readily attended to by the operator of the tractor, and this is a desideratum, by farmers who must, as a general rule, make all repairs on the farm.

Considering the operation of the tractor, it is obvious that with the gear transmission mechanism in the department 20 of the casing 14 that first, second or third speeds may be imparted to the shafts 24 and 25 from the engine or drive shaft 22 and that the operation of this drive shaft may be controlled in the usual manner, that is through a clutch, relative to the power plant 21 of the tractor. With the springs 45ª holding the pressure members 43 normally "in," the differential mechanism will be held for operating tractor in a forward direction and by releasing the pressure member 43 and setting the brake bands 51, the differential mechanism will operate to move the tractor in a reverse or backward direction. As the differential mechanisms are independently controlled, it is possible to drive one of the traction wheels forward and the other rearward, this causing the tractor to turn about practically in its own length, and even while both differentials are set for a reverse or backward movement of the tractor, it is possible through the steering mechanism to let up one of the brake bands so that one traction wheel will be more active than the other, and thus steer the tractor when backing. This may be accomplished through the brake band actuating mechanism shown in Fig. 10, as after the brake bands are set by the rod 62 for reverse movement, the rod 63 may be shifted to let up on either of the brake bands, and thus cause an inequality in the operation of the traction wheel which will cause the tractor to move in a desired direction when backing.

In Fig. 9 of the drawings, there is illustrated a slight modification of my invention, wherein a power plant 103 is located in each traction wheel or member. The juxtaposition of the power plant to the gear casing 104 is such that the driven crank shaft of the power plant may be coupled to a shaft 108, similar to the shaft 83, or have the shaft 108 as a prolongation of the crank shaft. With each traction wheel having an individual power plant, the operation of the tractor will be controlled solely by the power plants, thus eleminating differential and transmission mechanism and increasing the area of the tractor frame or body for other purposes, To recapitulate, it will observed that the sets of wheels 93, 94 and the wheels 101 will maintain the traction wheels in proper relation to the driving mechanism suspended from the rock shafts 69; that said rock shafts permit of the individual driving mechanism laterally tilting with the traction wheels while the wheels are being driven and this is accomplished by the universal joints and extensible shaft between the gear casings 73 and the shafts 87 operated by the worm shafts 31 and 32. While the flexibility of the traction wheel is limited by the stop lugs 75, 76 and 77, relative to the main frame or body of the tractor, yet there is sufficient movement and clearance for the traction wheels so that the tractor may be operated over very indurate, irregular or hilly ground.

What I claim is:—

1. In a tractor, traction wheels, longitudinal rock shafts in said wheels yieldably supported by said tractor and supporting said traction wheels for a limited lateral tilting movement relative to said tractor, rails in said wheels, driven wheels in said traction wheels engaging said rails and imparting movement to said traction wheels, means common to said traction wheels adapted for operating said driven wheels during the tilting action of said traction wheels, and other wheels movable to and from said rails and maintaining a driving relation between said driven wheels and said traction wheels.

2. In a tractor, the combination with a frame, gear casings extending from the sides of said frame and having a cushioned vertical movement relative thereto, traction wheels about said gear casings, racks in said traction wheels, a train of gears in each gear casing, wheels engaging said racks and driven by said train of gears, means extending into said gear casings for operating said train of gears, and adjustable wheels maintaining said racks in operative relation to the wheels meshing therewith.

3. In a tractor, the combination of a main frame having side extensions and frames, a power plant on said main frame, traction wheels about the side extensions and frames of said main frame, trunnions yieldably supported below the side extensions and frames of said main frame and supporting said traction wheels for a tilting movement at the sides of said frame, driven wheels in said traction wheels operated from said power plant and adapted for imparting movement to said traction wheels, and other wheels in said traction wheels maintaining a driving relation between said driven wheels and said traction wheels.

4. In a tractor, the combination with a main frame, and a power plant thereon, of tiltable traction wheels at the sides of said frame, each wheel having inner and outer rails with the outer rails providing racks, a plurality of wheels engaging said rails with some of said wheels engaging with the racks thereof and other of said wheels movable to and from the outer rails so that said traction wheels may be demounted relative to all of the other of said wheels, and means in said traction wheels operated from said power plant during any tilting action of said traction wheels for imparting movement to the wheels therein.

5. In a tractor, the combination with a main frame and a power plant thereon, of tiltable traction wheels at the sides of said frame, inner and outer rails in said traction wheels, a plurality of wheels engaging said rails with certain of said wheels establishing a driving relation with said traction wheels, and means including a train of gears and an extensible shaft operated from said power plant for imparting movement to certain of said wheels.

6. In a machine of the character described, the combination of a rotatable traction member, a frame extending into said member and pivotally and yieldably supported therein to permit of the traction member to tilt laterally, and means adapted for imparting motion to said member.

7. In a machine of the character described, the combination of a pair of traction wheels, tracks within the interior of said wheels, a frame extending into said wheels, wheels to travel on said tracks, means including rock shafts and springs for supporting said frames relative to said wheels, and means on said frame in each wheel for imparting movement to the wheels supporting said frame.

8. In a machine of the character described, the combination of a pair of traction wheels, a frame extending into each wheel, means in each wheel including springs and rock shafts so that the wheel may tilt laterally relative to said frame, and means in each wheel for imparting movement thereto.

In testimony whereof I affix my signature in the presence of two witnesses.

FRANK L. GLADISH.

Witnesses:
 LEWIS E. FLANDERS,
 ANNA M. DORR.